Dec. 30, 1969   M. R. PAINE   3,486,717
PROP-ROTOR PYLON STABILIZATION MEANS
Filed May 9, 1967   2 Sheets-Sheet 1

INVENTOR
MICHAEL R. PAINE

ATTORNEY

INVENTOR
MICHAEL R. PAINE

ATTORNEY

United States Patent Office

3,486,717
Patented Dec. 30, 1969

3,486,717
PROP-ROTOR PYLON STABILIZATION MEANS
Michael R. Paine, Irving, Tex., assignor to Bell Aerospace
Corporation, Hurst, Tex., a corporation of Delaware
Filed May 9, 1967, Ser. No. 637,117
Int. Cl. B64c 27/52
U.S. Cl. 244—17.25      12 Claims

ABSTRACT OF THE DISCLOSURE

Motion of the pylon of a pylon-supported, flapping prop-rotor is coupled into the control system with swashplate retardation and pitch-flop coupling to produce stabilizing in-plane rotor forces.

FIELD OF THE INVENTION

This invention relates to aircraft that include a pylon-supported, flapping, prop-rotor which provides for vertical lift in a helicopter configuration and translational thrust in an airplane configuration. In particular, the present invention provides means for stabilizing such a system at advanced forward speeds when performing in the airplane configuration.

THE PRIOR ART

Aircraft which employ pylon-supported, flapping prop-rotors have been flown sucessfully both in the airplane configuration and the helicopter configuration to demonstrate and embody the concept of converting such a rotor in flight from helicopter to airplane configuration, and vice versa. It has been found that, in the airplane configuration wherein the rotor performs the function of an airplane propeller, the system is unstable at advanced forward speeds. The present invention is directed to elimination of such instability.

SUMMARY

In accordance with this invention, a convertiplane pylon swashplate is coupled to the fuselage, when in an airplane configuration, to introduce a positive damping force responsive to pitching of the pylon. In a further aspect of the invention, swashplate retardation is employed in connection with pitch-flap coupling to counteract forces which otherwise whirl the pylon.

THE DRAWINGS

Figure 1:
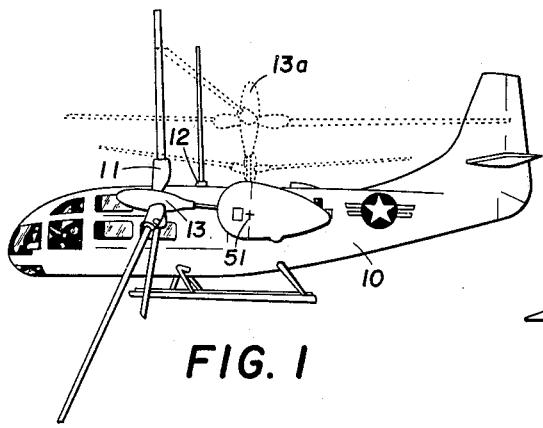
Figure 3:
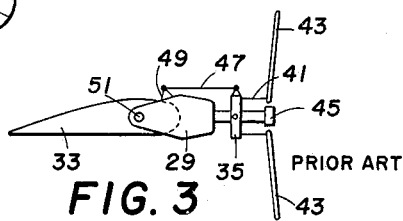
Figure 2:
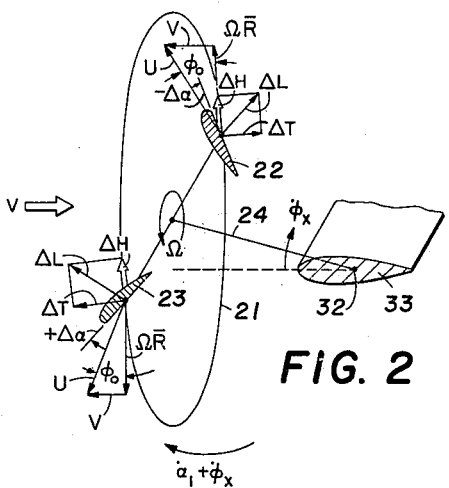
Figure 4:
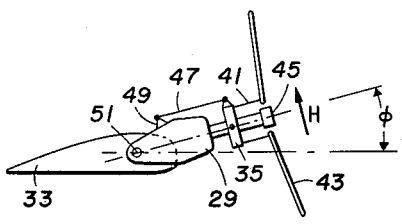
Figure 5:
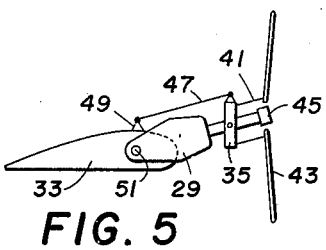
Figure 6:
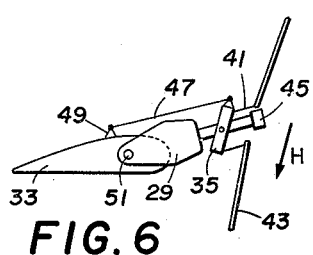
Figure 7:
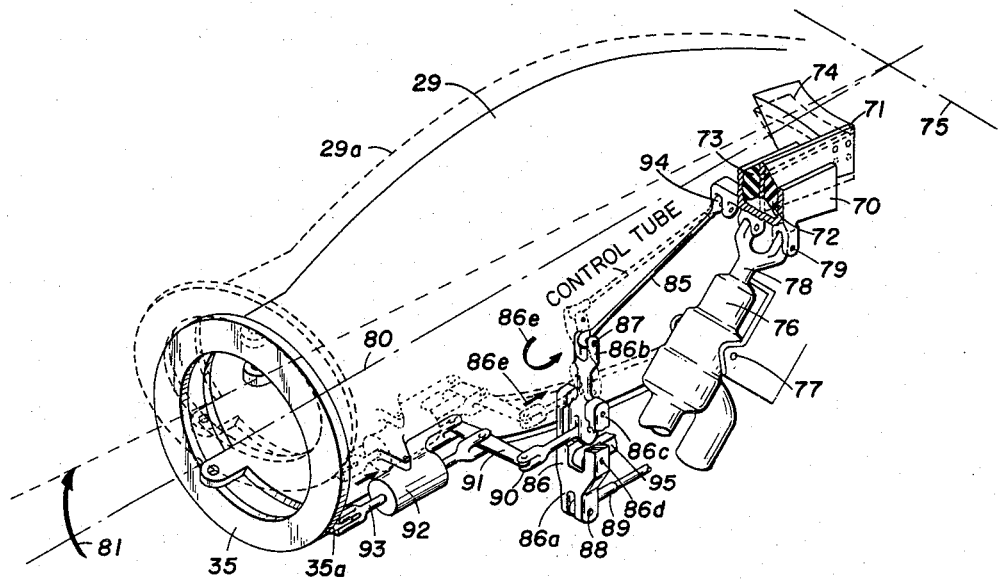
Figure 8:
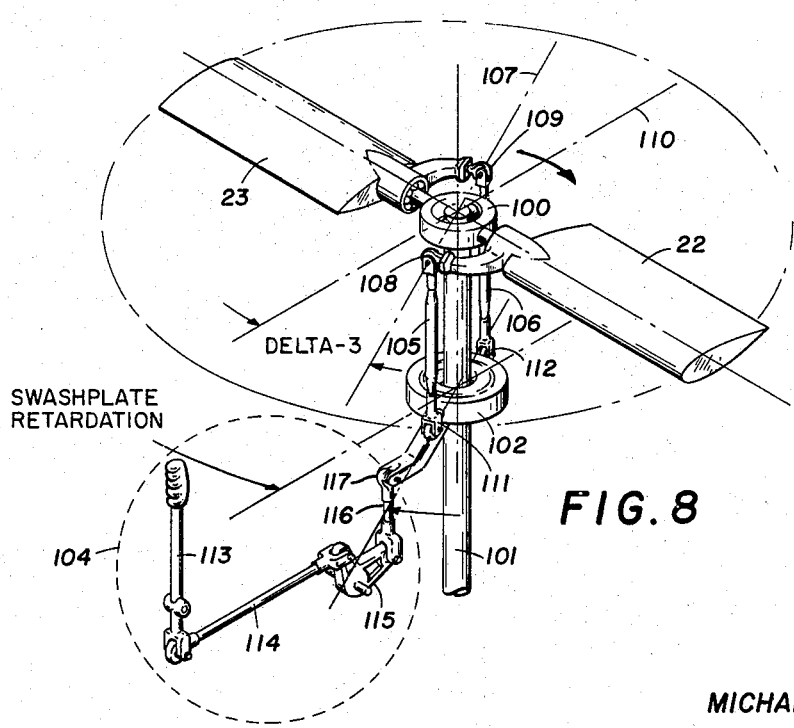

FIGURE 1 is a schematic diagram of a convertiplane operating in the airplane configuration;
FIGURE 2 schematically illustrates destabilizing forces acting upon the rotor of FIGURE 1;
FIGURE 3 schematically illustrates an unstable pylon/rotor system;
FIGURE 4 illustrates the system of FIGURE 3 with the pylon deflected;
FIGURE 5 is a schematic view of a neutrally stable pylon/rotor system;
FIGURE 6 schematically illustrates a positively stable pylon/rotor system;
FIGURE 7 is a perspective-type diagram showing changes in geometrical relations in a pylon/rotor system; and
FIGURE 8 illustrates the application of swashplate retardation and pitch-flap coupling to a rotor system.

THE PREFERRED EMBODIMENTS

In FIGURE 1, a convertiplane 10 is shown in an airplane configuration. Prop-rotors 11 and 12 are mounted on the tips of the aircraft's fixed wing and are movable between the vertical and horizontal positions. Each of the prop-rotor systems includes two or more rotor blades, or propellers, flappingly pivoted by means of a real pivot axis, or a virtual pivot axis which may be elastic, to a rotating mast or pylon. Prop-rotor 11 is thus mounted on a pylon 13. In a convertiplane, the pylon 13 is positioned horizontally to provide thrust to operate in the airplane configuration. As shown by the dotted outline 13a, it is positioned vertically to provide lift and thus to permit operation in a helicopter configuration. The change in position of the pylon and rotor between airplane and helicopter configuration is effected by rotation of the pylon around conversion axis 51. It should be appreciated that although the pylon will be essentially fixed in position horizontally in the airplane configuration or vertically in the helicopter configuration, or at any intermediate setting, there is a degree of resiliency between the pylon/rotor system and the fuselage or wing which permits some relative motion.

It has been found that an unstable condition develops in such a convertiplane when operating in the airplane configuration at high forward speeds.

While there are many contributing factors, it has now been found that a major cause of the instability of the pylon-supported, flapping prop-rotor in the airplane configuration can be attributed to the fact that there is a high rate of airflow through the rotors 11 and 12 perpendicular to the plane of rotation.

Referring to FIGURE 2, trajectory 21 represents the plane of rotation of a prop-rotor having two blades 22 and 23 (shown in section) which are flappingly supported and driven by pylon 24. With the pylon resiliently mounted along axis 32 of wing 33, the following definitions apply:

(1) $\Omega$ is the rotor rotational speed.
(2) $\Omega \bar{R}$ is the tangential velocity of the rotor blade at the ¾ radius.
(3) $\phi_x$ is the pitch rate of pylon 24.
(4) $\alpha_1 + \phi_y$ is the pitch rate of the rotor 21 in space.
(5) V is the inflow of air through the rotor at an advanced forward speed of the aircraft.
(6) U is the vector sum of the forward flight velocity V and the tangential veloocity $\Omega \bar{R}$.
(7) $\Delta \alpha$ is the change in blade element angle of attack.
(8) $\Delta L$ is the change in lift on the rotor blade.
(9) $\Delta T$ is the out of plane component of $\Delta L$.
(10) $\Delta H$ is the in-plane component of $\Delta L$.

The instability of the rotor is due to the clockwise pylon pitching velocity ($\phi_x$) and the tilting velocity ($\alpha_1 + \phi_x$) of the rotor in space. Tilting of the rotor in space will necessarily have been initiated by the differential aerodynamic lift forces on the rotor blades ($\Delta T$) perpendicular to the plane of rotation such as may be caused by a gust, for example. It can then be shown by analysis that as a result of the high inflow velocity through the rotor disk, the tilting of the rotor in space produces a force ($\Delta H$) on each blade which acts upwardly in the plane of the rotor to tilt or pitch the pylon in the same direction as the tilting of the rotor. This pitching of the pylon in turn introduces rotor forces that cause further tilting of the rotor in the same direction, which again create an in-plane force that pitches the pylon. Thus, the effects are cumulative so as to render the system unstable, particularly at high forward speeds, and the developed in-plane rotor forces ($\Delta H$) may be described as negative damping forces which contribute to instability.

In accordance with the invention, the motion of a pitching pylon is employed to produce a control force which is applied to the rotor so that differential aerodynamic lift forces and in-plane components thereof are produced by the rotor blades at least equal to and opposite to that which would have been otherwise produced by pitching of the pylon. By this means, the rotor/pylon system is stabilized.

Preferably a positive damping force is generated responsive to pitching motion of the pylon by coupling pylon motion to swashplate motion, and supplementing the latter coupling by introducing an appropriate proportion of pitch-flap coupling and swashplate retardation. Swashplate-pylon coupling employs angular movement of the pylon to change the angle between the swashplate and the pylon.

In order to assist in understanding the invention, a conventional or prior art system has been diagrammatically illustrated in FIGURE 3 in which there is no pylon-swashplate coupling. More particularly, control tube 41 interconnects the swashplate 35 and pitch horns of rotor blade 43. Tube 47 connects the swashplate 35 to a bracket 49 mounted on the pylon 29. In the airplane configuration, the swashplate 35 is thus fixed in position relative to the pylon 29 by rod 47. With this arrangement, pitching of the pylon will introduce aerodynamic forces into the rotor to cause additional spatial flapping of the rotor.

As shown in FIGURE 4, which embodies the same arrangement as FIGURE 3, pitching of pylon 29 produces a rotor in-plane force H which tends further to move the pylon 29 in the direction of the pitch motion and an instability is introduced.

FIGURE 5 illustrates a system of neutral stability in accordance with this invention. In FIGURE 5, the swashplate 35 is no longer pylon-based, but is coupled to the fuselage 33 instead. More particularly, rod 47 is attached to swashplate 35 and to bracket 49 secured to wing 33. The points of attachment are so located with reference to the pivot point of the swashplate on the pylon that pitching of the pylon does not disturb the spatial orientation of the swashplate. Because the swashplate does not rotate in space in response to pitching, the pitching of the pylon will not introduce disturbing forces into the rotor so as to produce in-plane forces that will further drive the pylon in the direction of the pitching motion. Hence, the sequence of destabilizing forces is, in a sense, aborted and the system is neutrally stable. The system of FIGURE 5 is thus one of neutral stability.

FIGURE 6 illustrates a system in which a positive stabilizing force is introduced. As in the configuration of FIGURE 5, the swashplate 35 is fixed to the fuselage by tube 47. However, in this case the points of attachment of the tube 47 are so located that pitching of the pylon causes the swashplate to tilt in an opposite direction and to a slightly greater extent than the pylon. This introduces control to the rotor to produce an in-plane force H that opposes further pitching of the pylon. A force acting in this manner is positively damping and, hence, stabilizing.

Diagrammatically, the difference between the neutral system of FIGURE 5 and the postively damped system of FIGURE 6 is represented by the difference in location of bracket 49 relative to the pivot point 51 of the pylon on the wing 33. In the system of FIGURE 5, the pylon 29 and the tube 47 form sides of a parallelogram. In FIGURE 6 (shown out of proportion for emphasis), the pylon and tube 47 are not such as to remain parallel.

The invention has been illustrated only schematically in FIGURES 1–6. One embodiment of the invention is illustrated in FIGURE 7 wherein the pylon 29 is shown in the high speed, airplane flight mode with the axis 80 of the pylon 29 horizontally directed. Through operation of the conversion actuator 76 the pylon can be rotated clockwise around axis 75, which is mounted on the wing (not shown) to a vertical position for operation in the helicopter mode.

Pylon 29 is resiliently tied to the wing by way of a channel-shaped bracket 70 and conversion actuator 76, which is pivotally secured to the wing by bracket 77. The resilient pylon support includes a bar 71 which extends centrally through channel 70 and is secured in channel 70 by molded rubber bodies 72 and 73. The bar 71 has a pylon seating structure 74 to which the pylon is secured at a point intermediate the length thereof. Conversion actuator 76 is pivotally attached to bracket 77 and has an actuator arm 78 that is linked to pivot 79 on the bottom of channel 70.

The swashplate 35 is effectively coupled to pitching of the pylon by way of linkage system which includes a control tube 85 and a mixing lever indicated generally by the reference numeral 86. Mixing lever 86 has a first input at the pivot 87 from the control tube 85 and a second input at the pivot 88 from the control tube 89. It will be appreciated that in the high speed airplane mode illustrated in FIGURE 7, pilot cyclic control operation through flight control tube 89 is phased out and tube 89 is therefore effectively fuselage based. The mixing lever 86 includes a lower female member 86a and an upper male member 86b which is pivotally mounted in member 86a at pivot 86c. The female member 86a is pivoted to the pylon fuselage at pivot 86d of bracket 95. The output from the mixing lever 86 includes a control link 90 which is coupled to a beam 91 which serves as the input to a hydraulic booster 92. The booster piston 93 is then coupled to a link 35a on the swashplate 35.

Control tube 85 is positioned approximately parallel to the actuator 76 in the mode illustrated in FIGURE 7; it is positioned 90° to the actuator in the helicopter mode (not shown). Pitching of the pylon from position 29 to 29a will cause deformation of the rubber mounting 71–73 along the axis of the conversion actuator 76 and will cause tube 85 to move, thus introducing control to the swashplate through mixing lever 86, link 90, beam 91, hydraulic booster 92, and booster piston 93. With upward pitching of the pylon from 29 to 29a, movement of control tube 85 will cause counterclockwise rotation (arrow 86e) of lever 86b and counterclockwise rotation of swashplate 35. Thus, when a gust strikes the rotor causing the pylon 29 to move up to the position represented by the dotted outline 29a, the control tube 85 also moves, changing the input to the hydraulic booster 92 so that the swashplate changes in the sense indicated in connection with FIGURES 1–2 and 5–6, i.e., the swashplate is actuated in a direction which opposes the pylon pitch motion and tends to restore the pylon to its original position.

It should be recognized that the pivotal mounting of a pylon for conversion between the helicopter mode and high forward speed, airplane mode is heretofore known. The addition to such system of coupling to the swashplate for the introduction of cyclic control in direction opposite to the pitching motion of the pylon has not heretofore been known or employed for high speed stabilization.

A second effect of the high degree of air inflow in forward flight in the airplane configuration is that rotor flapping becomes excessive. Rotor flapping is the movement of the blade perpendicularly to its plane of rotation. To correct this it has been found advantageous by many to introduce pitch-flap coupling. Pitch-flap coupling employs interaction between flapping of the rotor blade and control of the pitch angle of the blade. Pitch angle is the angle between the blade chord and the rotor disk, i.e., the plane of rotor rotation. The forward thrusting direction of the airplane prop-motor may be considered equivalent to upward thrust in the helicopter configuration, and reference herein to pitch-flap coupling will thus mean a reduction of pitch with upward flapping of the blade, and increase of pitch with downward flapping. This pitch-flap coupling is commonly identified as delta-3 and it is measured by the angle defined between a first line from the center of the flapping axis to the attachment point of the swashplate control rod and a second line from the center of the flapping axis perpendicular to the longitudinal axis of the rotor blade.

Referring to FIGURE 8, which illustrates delta-3 blades 22 and 23 are mounted on yoke 100 which is pivotally supported along axis 110 at the end of mast 101 with the swashplate 102 being supported on the mast 101 below yoke 100. The control linkage 104 diagrammatically represents the non-rotating cyclic flight controls leading to the swashplate 102 which will include cyclic control stick 113, control rod 114, lever 115, link 116 and swashplate attachment bracket 117.

Control tubes 105 and 106 are coupled between the swashplate 102 and the pitch horns on blades 22 and 23, respectively.

In a rotor without delta-3, the attachment points 108 and 109 between control rods 105 and 106 and the pitch horns of blades 22 and 23, respectively, would be located along axis 110. As illustrated, delta-3 is introduced by locating these attachment points along axis 107. When the rotor blade 22, for example, flaps upwardly around its flapping axis 110, it will be appreciated that, by virtue of the attachment point 108 being positioned on axis 107 instead of on axis 110, such upward flapping will cause a reduction in the pitch of the rotor blade.

While the introduction of delta-3 reduces excessive blade flapping, it has been determined that it also introduces a destabilizing effect. It is considered that the destabilizing effect of delta-3 is caused by its effect upon blade flapping frequency which is increased because the higher airloads resulting from delta-3 act like a spring trying to reduce blade flapping. As a result, the blade flapping frequency that is sensed by the pylon may approach the natural frequency of the pylon, thereby increasing pylon pitching movements. In the absence of pylon-swashplate coupling, such pylon movements would, as previously explained, induce in-plate forces that would further excite and enlarge the pylon motion. However, the pylon-swashplate coupling with which this invention is concerned aborts such a destabilizing sequence of events by converting pylon into a stabilizing, positively damping, in-plane force.

An additional effect of delta-3, one that is not corrected or compensated by pylon-swashplate coupling, is the flapping, phase shift caused by the increase in flapping frequency. By flapping, phase shift is meant the change from the 90° gyroscopic-type phase response of the rotor blades to a control command or other type of upsetting force. The effect of the phase shift is to create a coupling of longitudinal and lateral motions which results in a whirling of the pylon.

It has been determined that such flapping phase shift can be overcome or compensated by employing swashplate retardation of an amount approximately equal to the amount of delta-3 in the system preferably of the order of 20°. Swashplate retardation, as illustrated in FIGURE 8, refers to the positional relationship between the points of attachment 111 and 112 between the swashplate 102 and the swashplate control rods 105 and 106, and the rotor blades 22 and 23, respectively. The attachment points lead their respective rotor blades in the direction of rotation of the rotor by about 90° in order to compensate for the gyroscopic precession of the blade in response to control inputs. In accordance with the present invention, these attachments points leads their respective blades only by an angle approximately equal to the amount of delta-3 employed in the system, as shown.

The employment of pitch-flap coupling and swashplate retardation in the proportions herein defined enhance the benefits contributed by the pylon-swashplate coupling hereinbefore described and provide flight characteristics greatly improved over prior systems.

What is claimed is:

1. In an aircraft having a fuselage, the combination which comprises:
   (a) a pylon pivoted at one end for rotation relative to said fuselage and having a flapping prop rotor at the other end with a swashplate thereon for controlling cyclic and collective pitch of said rotor;
   (b) actuator means coupled between said fuselage and an intermediate point on said pylon and having resilient means for attaching said actuator to said intermediate point for selective angular adjustment of said pylon about said pivot point between an airplane configuration and a helicopter configuration;
   (c) a first linkage leading to said swashplate for selective introduction by a pilot of collective and cyclic pitch; and
   (d) a second linkage fixed at one end to said fuselage and at the other end to said swashplate for producing cyclic changes in the pitch of said rotor in response to pitching motion of said pylon with respect to said fuselage for reduction of in-plane forces which act upon said pylon in the same direction as said pitching motion.

2. The combination in claim 1 wherein said rotor has pitch-flap coupling.

3. The combination in claim 1 wherein said rotor has swashplate retardation.

4. The combination defined in claim 1 wherein said rotor has pitch-flap coupling and swashplate retardation in approximately equal amounts.

5. The combination defined in claim 1 wherein said second linkage produces in-plane forces which act in a direction opposite to said pitching motion.

6. A system for stabilizing a flapping prop-rotor for propelling a fuselage under conditions of high air inflow which comprises:
   (a) a swashplate,
   (b) means for linking said swashplate to the blades of said rotor for cyclic pitch control,
   (c) means for supporting said rotor and said swashplate including a pylon pivotally mounted and resiliently supported for pitching movement relative to a fuselage,
   (d) a first linkage leading to said swashplate for selective introduction by a pilot of collective and cyclic pitch, and
   (e) a second linkage leading to said swashplate and anchored to said fuselage for coupling pitching motion of said pylon to said swashplate to reduce in-plane rotor forces produced by pitching motion and which act upon said pylon in the same direction as the pitching motion of said pylon.

7. The combination set forth in claim 6 wherein the linkage between said fuselage and said swashplate generates in-plane rotor forces which act in a direction opposite to the pitching motion of the pylon.

8. In a convertiplane where a rotor is mounted on a pylon which is pivotally mounted on an air frame and is selectively positionable in an airplane or in a helicopter configuration, the combination which comprises:
   (a) a swashplate mounted to provide cyclic control to said rotor in the helicopter configuration,
   (b) a first linkage leading to said swashplate for selective introduction by a pilot of collective and cyclic pitch in said helicopter configuration, and
   (c) a second linkage leading to said swashplate responsive to pitching of said pylon in the airplane configuration to introduce cyclic control through said swashplate in a direction opposite to the pitch motion of said pylon for stabilization at advanced forward speeds.

9. The combination set forth in claim 8 further characterized by means for providing pitch-flap coupling.

10. The combination set forth in claim 8 further characterized by means for providing swashplate retardation.

11. The combination set forth in claim 8 further characterized by means for providing pitch-flap coupling and means for providing swashplate retardation.

12. The combination set forth in claim 11 wherein the swashplate retardation and pitch-flap coupling is of the order of 20°.

(References on following page)

References Cited

UNITED STATES PATENTS

| | | | |
|---|---|---|---|
| 2,437,330 | 3/1948 | Mullgardt | 244—6 XR |
| 2,468,913 | 5/1949 | Avery | 244—7 |
| 3,081,966 | 3/1963 | Avery | 244—17.19 XR |
| 3,132,697 | 5/1964 | Cheesman et al. | 170—160.26 XR |
| 3,213,944 | 10/1965 | Nichols et al. | 170—160.26 XR |
| 3,288,397 | 11/1966 | Fitzpatrick | 244—96 XR |
| 3,347,320 | 10/1967 | Cresap et al. | 170—160.26 |

MILTON BUCHLER, Primary Examiner

P. E. SAUBERER, Assistant Examiner

U.S. Cl. X.R.

170—160.26, 160.27; 244—7

PO-1050
(5/69)

UNITED STATES PATENT OFFICE
CERTIFICATE OF CORRECTION

Patent No. 3,486,717              Dated December 30, 1969

Inventor(s) Michael R. Paine

It is certified that error appears in the above-identified patent and that said Letters Patent are hereby corrected as shown below:

Col. 1, line 13, "pitch-flop" should be --pitch-flap--.
Col. 2, line 41, "veloocity" should be --velocity--.
Col. 4,
       line 61, "prop-motor" should be --prop-rotor--.
Col. 5, line 31, "in-plate" should be --in-plane--;
       line 35, "pylon into" should be --pylon motion into--;
       line 59, "attachments Points leads" should be
            --attachment points lead--.

SIGNED AND
SEALED
JUL 21 1970

(SEAL)
Attest:

Edward M. Fletcher, Jr.
Attesting Officer

WILLIAM E. SCHUYLER, JR.
Commissioner of Patents